(12) United States Patent
Mc Namara et al.

(10) Patent No.: US 11,729,577 B2
(45) Date of Patent: Aug. 15, 2023

(54) BUILDING MANAGEMENT SYSTEM WITH GEOFENCED CONFIGURATION TEMPLATES

(71) Applicant: Johnson Controls Tyco IP Holdings LLP, Milwaukee, WI (US)

(72) Inventors: Edward Gerard Mc Namara, Old Pallas (IE); James Callanan, Cork (IE)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 12 days.

(21) Appl. No.: 17/370,847

(22) Filed: Jul. 8, 2021

(65) Prior Publication Data
US 2023/0008698 A1    Jan. 12, 2023

(51) Int. Cl.
*H04W 4/021* (2018.01)

(52) U.S. Cl.
CPC .................. *H04W 4/021* (2013.01)

(58) Field of Classification Search
CPC ....... H04W 4/02; H04W 4/021; H04W 4/023; H04W 4/024; H04W 4/025; H04W 4/029; H04W 4/30; H04W 4/33; H04W 64/00; G01S 5/01; G01S 5/011; G01S 5/012; G01S 5/013; G01S 5/14; G01S 5/015
See application file for complete search history.

(56) References Cited

U.S. PATENT DOCUMENTS

| 6,968,179 B1 | 11/2005 | De Vries |
| 7,099,895 B2 | 8/2006 | Dempsey |
| 7,394,370 B2 | 7/2008 | Chan |
| 7,598,854 B2 | 10/2009 | Wong |
| 7,705,723 B2 | 4/2010 | Kahn et al. |
| 7,817,046 B2 | 10/2010 | Coveley et al. |

(Continued)

FOREIGN PATENT DOCUMENTS

| JP | 2010-128976 A | 6/2010 |
| KR | 20200047457 A | 5/2020 |
| WO | WO-2021/258116 A1 | 12/2021 |

OTHER PUBLICATIONS

Condeco Group, "Meeting Room & Desk Booking Systems," URL: www.condecosoftware.com/, Retrieved from Internet Sep. 9, 2020, 10 Pages.

(Continued)

*Primary Examiner* — Jean A Gelin
(74) *Attorney, Agent, or Firm* — Foley & Lardner LLP

(57) ABSTRACT

A configuration template management system for a building includes one or more memory devices configured to store instructions thereon. When executed by one or more processors, the instructions cause the one or more processors to monitor a location of a device having a plurality of configurable settings within an environment. The environment has a first geofenced zone associated with a first configuration template and a second geofenced zone associated with a second configuration template. The instructions further cause the one or more processors to detect that the device is within the first geofenced zone based on the monitored location of the device. The instructions further cause the one or more processors to cause the device to adopt the first configuration template based on the detection that the device is within the first geofenced zone.

20 Claims, 7 Drawing Sheets

(56) References Cited

U.S. PATENT DOCUMENTS

| | | | |
|---|---|---|---|
| 7,941,096 | B2 | 5/2011 | Perkins et al. |
| 7,993,266 | B2 | 8/2011 | Colston et al. |
| 8,049,614 | B2 | 11/2011 | Kahn et al. |
| 8,405,503 | B2 | 3/2013 | Wong |
| 8,867,993 | B1 | 10/2014 | Perkins et al. |
| 9,075,909 | B2 | 7/2015 | Almogy et al. |
| 9,741,233 | B2 | 8/2017 | Laufer et al. |
| 10,068,116 | B2 | 9/2018 | Good et al. |
| 10,198,779 | B2 | 2/2019 | Pittman et al. |
| 10,251,610 | B2 | 4/2019 | Parthasarathy et al. |
| 10,257,642 | B2 | 4/2019 | Pittman et al. |
| 10,803,993 | B2 | 10/2020 | Huang |
| 10,856,103 | B2 * | 12/2020 | Merjanian ............ H04B 7/0617 |
| 2006/0036619 | A1 | 2/2006 | Fuerst et al. |
| 2006/0085483 | A1 | 4/2006 | Mooney et al. |
| 2009/0319765 | A1 * | 12/2009 | Fehrle .................... H04L 41/08 713/1 |
| 2010/0333168 | A1 * | 12/2010 | Herrod ................. H04W 12/00 726/1 |
| 2012/0056720 | A1 | 3/2012 | Barvick et al. |
| 2014/0049376 | A1 | 2/2014 | Ng |
| 2015/0176998 | A1 * | 6/2015 | Huang ................. H04W 4/021 701/400 |
| 2015/0257119 | A1 * | 9/2015 | Hahm ................... G06F 1/1684 324/226 |
| 2015/0310490 | A1 * | 10/2015 | Meredith ........... G06Q 30/0261 705/14.58 |
| 2016/0005300 | A1 | 1/2016 | Laufer et al. |
| 2016/0357422 | A1 * | 12/2016 | Milden ................. G06F 3/0488 |
| 2017/0026897 | A1 * | 1/2017 | Hanson ................. H04W 24/02 |
| 2017/0123440 | A1 | 5/2017 | Mangsuli et al. |
| 2017/0124850 | A1 | 5/2017 | Kramer |
| 2017/0206334 | A1 | 7/2017 | Huang |
| 2018/0048998 | A1 * | 2/2018 | Mahajan ............... H04W 4/025 |
| 2018/0052970 | A1 | 2/2018 | Boss et al. |
| 2018/0091939 | A1 * | 3/2018 | Venkatraman ........ H04W 4/021 |
| 2018/0104162 | A1 | 4/2018 | Park |
| 2018/0204162 | A1 | 7/2018 | Endel et al. |
| 2019/0029056 | A1 * | 1/2019 | Hor-Lao ................ H01Q 25/04 |
| 2019/0196424 | A1 * | 6/2019 | Meganathan ........... G06F 16/29 |
| 2019/0228348 | A1 | 7/2019 | O'Keefe-Sally et al. |
| 2020/0167148 | A1 * | 5/2020 | Park ......................... G06F 8/65 |
| 2020/0176124 | A1 | 6/2020 | Chatterjea et al. |
| 2020/0176125 | A1 | 6/2020 | Chatterjea et al. |
| 2021/0051444 | A1 * | 2/2021 | Ryu ...................... H04W 4/029 |
| 2021/0158675 | A1 * | 5/2021 | Burris .................... G06V 20/53 |
| 2021/0193309 | A1 | 6/2021 | Boisvert et al. |
| 2021/0313075 | A1 | 10/2021 | Mc Namara et al. |
| 2021/0374620 | A1 | 12/2021 | Tokuchi et al. |
| 2021/0390807 | A1 | 12/2021 | Chaurasia et al. |
| 2021/0390812 | A1 | 12/2021 | Chaurasia et al. |
| 2021/0391089 | A1 | 12/2021 | Eswara et al. |
| 2021/0398659 | A1 | 12/2021 | Sharma et al. |
| 2021/0398690 | A1 | 12/2021 | Gibson et al. |
| 2021/0398691 | A1 | 12/2021 | Dhamija et al. |
| 2022/0060856 | A1 | 2/2022 | Wellig et al. |

OTHER PUBLICATIONS

Condeco, "Back to the new normal," 2020, 12 Pages.

Condeco, "How tomorrow will work: returning to the office after COVID-19 Guide," URL: https://www.condecosoftware.com/modern-workplace/asset/ebooks/returning-to-the-office-after-covid-19-guide/, Retrieved from Internet Dec. 14, 2021, 8 Pages.

Condeco, "Making your employees safety a priority when coming into the office," URL: https://www.condecosoftware.com/blog/employee-office-safety/, Sep. 27, 2020, 5 Pages.

Condeco, "Office layouts for the post COVID-19 workplace," URL: https://www.condecosoftware.com/blog/office-design-post-covid-19-workplace/, Jun. 25, 2020, 6 Pages.

Condeco, "Putting your employees health and well-being first—post-pandemic mental health tips," URL: https://www.condecosoftware.com/blog/employee-health-well-being-post-pandemic/, Sep. 17, 2020, 5 Pages.

Condeco, "Rethinking and reshaping your workspace," URL: https://www.condecosoftware.com/blog/rethinking-reshaping-workspace/, May 27, 2021, 5 Pages.

Condeco, "Returning to the office after COVID-19." URL: https://www.condecosoftware.com/modern-workplace/wp-content/uploads/sites/10/2020/05/TL-SOL-226-EN_Returning-to-the-office-after-COVID-19.pdf, Retrieved from Internet Dec. 14, 2021, 23 Pages.

Condeco, "Returning to the Office Post COVID-19: and why businesses can't afford to get this wrong.," URL:https://www.condecosoftware.com/blog/returning-to-the-office-post-covid-19/, May 6, 2020, 5 Pages.

Condeco, "Safe social distancing measures on your return to the office," URL: https://www.condecosoftware.com/blog/safe-office-social-distancing-measures/, May 26, 2020, 6 Pages.

Condeco, "The future of the workplace and effective workspace scheduling," URL: https://www.condecosoftware.com/blog/future-workspace-scheduling/, Oct. 24, 2020, 5 Pages.

Condeco, "The post-COVID workplace." URL: https://www.condecosoftware.com/modern-workplace/asset/ebooks/post-covid-workplace/, Retrieved from Internet Dec. 14, 2021, 7 Pages.

Condeco, "The work-related COVID-19 questions we're all asking," URL: https://www.condecosoftware.com/blog/work-related-covid-questions/, Oct. 29, 2020, 5 Pages.

Condeco, "What's next? Your work life after COVID-19," URL: https://www.condecosoftware.com/blog/work-life-after-covid/, Jul. 27, 2021, 5 Pages.

Condeco, "Workplace cleanliness: The facts for a post-isolation working environment," URL: https://www.condecosoftware.com/blog/workplace-cleanliness-facts/, Apr. 23, 2020, 6 Pages.

Officespace Software, "OfficeSpace Software: The Smarter Facility Management Software," URL: www.officespacesoftware.com/, Retrieved from Internet Sep. 9, 2020, 5 Pages.

* cited by examiner

BUILDING MANAGEMENT SYSTEM WITH GEOFENCED CONFIGURATION TEMPLATES

BACKGROUND

The present disclosure relates to systems and methods for building management. More particularly, this application relates to systems and methods for operating buildings with respect to ID devices associated with occupants and assets. A building environment can have multiple zones or areas ranging from private zones to public zones, from quiet zones to loud zones, etc. Occupants and assets may regularly move between the various zones or areas of the building environment. Therefore, systems and methods that enable dynamic monitoring of and communication with occupants and assets using ID devices in multiple zones or areas is desired.

SUMMARY

One implementation of the present disclosure is a configuration template management system for a building. The configuration template management system includes one or more memory devices configured to store instructions thereon. When executed by one or more processors, the instructions cause the one or more processors to monitor a location of a device having a plurality of configurable settings within an environment. The environment has a first geofenced zone associated with a first configuration template and a second geofenced zone associated with a second configuration template. The instructions further cause the one or more processors to detect that the device is within the first geofenced zone based on the monitored location of the device. The instructions further cause the one or more processors to cause the device to adopt the first configuration template based on the detection that the device is within the first geofenced zone.

Another implementation of the present disclosure is method including monitoring, by processing circuitry, a location of a device having a plurality of configurable settings within an environment. The environment has a first geofenced zone associated with a first configuration template and a second geofenced zone associated with a second configuration template. The method further includes detecting, by processing circuitry based on the monitored location of the device, that the device is within the first geofenced zone. The method further includes causing, based on the detection that the device is within the first geofenced zone, the device to adopt the first configuration template.

Another implementation of the present disclosure is one or more memory devices configured to store instructions thereon that, when executed by one or more processors cause the one or more processors to monitor a location of a first device within an environment having a first geofenced zone and a second geofenced zone. The instructions cause the one or more processors to detect, based on the monitored location of the first device, whether the first device is within the first geofenced zone or the second geofenced zone. The instructions cause the one or more processors to, responsive to determining the location of the first device is within the first geofenced zone, cause the first device to record interactions with one or more other devices within the first geofenced zone. The instructions cause the one or more processors to, responsive to determining the location of the first device is within the second geofenced zone, cause the first device not to record interactions with the one or more other devices within the second geofenced zone.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
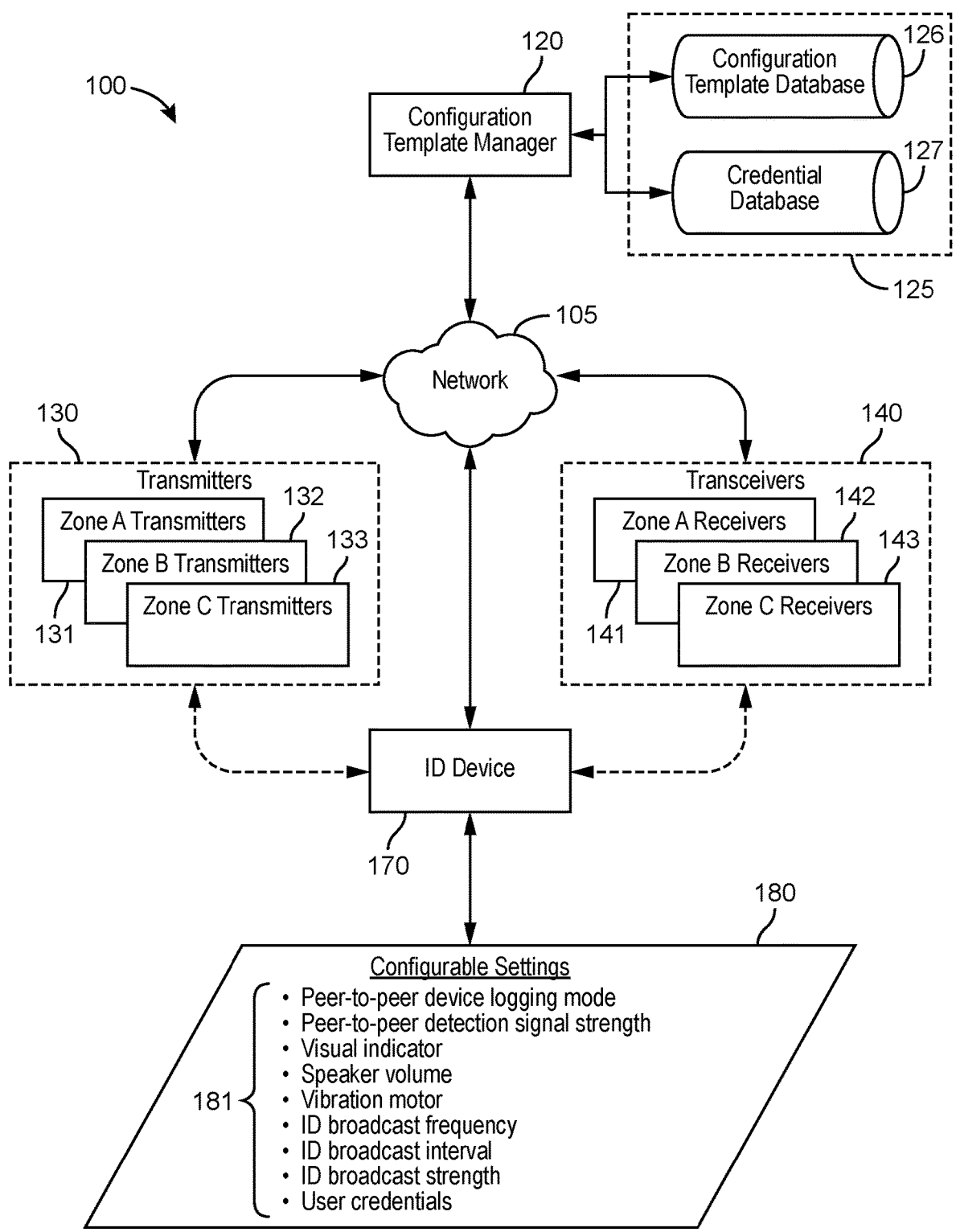
FIG. 1 is a block diagram of a system for implementing a building management system with geofenced configuration templates, according to an exemplary embodiment.

Referring generally to the FIGURES, systems and methods are shown and described for geofenced configuration template management within a monitored environment, such as a building environment according to an exemplary embodiment. Furthermore, the systems and methods described herein can enhance the functionality and flexibility of ID devices that are used to monitor or communicate with occupants or assets that move within the monitored environment. A geofenced configuration template management system can wirelessly monitor the location of various ID devices associated with occupants and assets that move between various geofenced zones of the monitored environment. The ID devices may be configured to wirelessly communicate with the geofenced configuration template management system and may include a plurality of configurable settings. As the ID device moves from one geofenced zone to another, the geofenced configuration template management system may detect that the ID device location has changed and may cause the ID device to adopt a configuration template associated with the newly-occupied zone.

In some instances, the geofenced configuration template management system may be configured to compare an initial configuration template of the ID device with a configuration template associated with a newly-occupied zone. If the initial configuration template and the configuration template associated with the newly-occupied zone do not match (i.e. are dissimilar), the configuration template management system may cause the ID device to adopt the configuration template associated with the newly-occupied zone. The configuration template may be stored remotely from the ID device (e.g., in a cloud-based database) or locally on the ID device (e.g., in a memory device). When the configuration templates are stored remotely, the configuration template management system may transmit the configuration template to the ID device. If the configuration templates are stored locally on the ID device, the configuration template management system may transmit a command to the ID device to adopt the configuration template, whereupon the ID device may adopt the configuration template. Likewise, the ID device may, in response to receiving a signal from the configuration template management system, a transceiver, a transmitter, or otherwise, select a configuration template from the local memory device and adopt the configuration template. Furthermore, the ID device may, in response to failing to receive a signal from the configuration template management system, a transceiver, a transmitter, or other device, revert back to a default, generic, or standard configuration template.

The geofenced configuration template management system can allow for the flexible and efficient use of ID devices within a monitored environment having varied zones. For example, the geofenced configuration template management system may permit a single ID device to effectively operate within both a high privacy environment where transmissions to or from the ID device are not desirable and in a high interference environment, where increasing the frequency and strength of transmissions is desirable to ensure effective communication between multiple ID devices. Moreover, the geofenced configuration template management system may allow for the dynamic implementation of building policies using ID devices (e.g., a social distancing policy) in certain circumstances, while changing the policy in other circumstances (e.g., halting social distance monitoring when the ID device is not worn, but is instead stored in close proximity to other ID devices). Furthermore, the dynamic implementation of configuration templates according to geofenced zone may allow for the extension of ID device battery life (e.g., halting transmissions to or from the ID device when the ID device is held in a storage area).

Referring now to FIG. 1, a geofenced configuration template management system 100 is shown. The geofenced configuration template management system 100 is configured to track ID devices that are associated with occupants (e.g., people) and assets (e.g., equipment, material, etc.) within a monitored environment, such as an office building, manufacturing facility, etc. Various types of geofenced configuration template systems are included in various embodiments. For example, in some embodiments the geofenced configuration template management system 100 is implemented as part of an access and security system, in which a user can enter or exit a space by presenting a badge to an electronic card reader (e.g., RFID, magnetic stripe, etc.). In such embodiments, the geofenced configuration template management system 100 may cause a configuration template of an ID device to change based on an occupant's presence within and/or movement between various secure spaces.

In another embodiment, the geofenced configuration template management system 100 may include a configuration template manager 120, transmitters 130, transceivers 140, and an ID device 170. The geofenced configuration template management system 100 may further include a network 105 that facilitates communication between the various components of the system 100. Specifically, the configuration template manager 120, the transmitters 130, the transceivers 140, and the ID device 170 may be communicably coupled to each other over the network 105, according to one embodiment. The network 105 may be a building network (e.g., BACNet, MSTP, etc.), an information technology network (e.g., Ethernet, Wi-Fi, etc.), a cellular network, or some other wireless network.

The configuration template manager 120 include configuration template manager database 125, which include a configuration template database 126 and a credential database 127. The transceivers 140 can be Bluetooth Low Energy (BLE) transceivers, Ultra-wide Band (UWB) transceivers, 5G transceivers, Wi-Fi transceivers, radio transceivers, etc. The ID device 170 may be formed as BLE devices (e.g., BLE badges), UWB devices, 5G (i.e. cellular) devices (e.g., a cell phone), or devices using a similar radio communications technology, which may be worn or carried by personnel in the monitored environment. The transceivers 140 and the ID device 170 may thus communicate using BLE, Wi-Fi, UWB, radio communications, etc. Furthermore, the transceivers 140 may communicate with and/or recognize the presence of the ID device 170 using Near-Field Magnetic Induction (NFMI) communication technology, Ultrasound, Infra-Red, Thermal Imaging, Lightning (e.g., LED), or Video recognition, or other near-field communication (NFC) technology. For example, NFMI-enabled transceivers 140 may generate short-range magnetic fields and may be configured to detect the presence of a nearby ID device 170 within the short-range magnetic field. The transceivers 140 and ID device 170 may additionally include processing circuitry, memory, storage, computer-readable instructions that can be executed by the processing circuitry, and a power source (e.g., a battery) to further facilitate the communication between the transceivers 140 and the ID device 170 to communicate with the transceivers 140, transmitters 130, and/or configuration template manager 120.

The transceivers 140 may be arranged around the monitored environment. For example, the transceivers 140 may be divided into groups of transceivers 140 corresponding to various zones of the environment, including Zone A transceivers 141, Zone B transceivers 142, and Zone C transceivers 143. Each transceiver 140 may be configured to detect the presence of the ID device 170 and determine a distance from a ID device 170 to the transceiver 140. Based on the distance of an ID device to three or more transceivers 140 (trilateration and/or triangulation), the location of the ID device 170 can be determined with a high degree of accuracy. Alternatively, the location of the ID device 170 could be determined using NFMI communication, BLE communication, or some other means that sufficiently identifies the presence of the ID device 170 as within a geofenced zone. Such a system may allow for occupant tracking across multiple spaces (e.g., rooms, zones, etc.) within the environment regardless of whether the spaces are separated by walls or doors, and also allow for the precise location of occupants within the environment.

In another embodiment, the ID device 170 may monitor location via peer-to-peer communication, where proximity between one ID device 170 and another ID device 170 can be determined at least in part by the strength of a Bluetooth signal, Wi-Fi signal, sonic ping, or other method. In yet another embodiment, the location of the ID device 170 may be determined with 5G based cell phone location, cell phone to cell phone communication, Time of Flight (ToF) via Wi-Fi based on cell phone Wi-Fi communication, trilateration and/or triangulation from multiple routers, etc. In such embodiments, the ID device 170 may be a mobile telephone (i.e. cell phone) or a similar device.

The ID device 170 may include a plurality of configurable settings 181, which may be arranged in a configuration template 180, according to an exemplary embodiment. For example, the configurable settings 181 of ID device 170 may include (a) peer-to-peer logging mode (e.g., on/off), (b) peer-to-peer detection signal strength (e.g., dBm value), (c) visual indicator (e.g., on/off/color change/display message), (d) speaker volume (e.g., high/normal/off), (e) vibration motor (e.g., on/off), (f) ID broadcast frequency (e.g., Hz value), (g) ID broadcast interval (e.g., time in milliseconds), (i) ID broadcast strength (e.g., dBm value), and (j) user credentials (e.g., credentials associated with an occupant). A first configuration template may prescribe or include a plurality of configurable settings 181 (e.g., vibration off, visual indicator off, speaker volume muted, ID broadcast frequency low, etc.), for example. A second configuration template may prescribe or include a second plurality of configuration settings (e.g., vibration on, visual indicator on, speaker volume high, ID broadcast frequency high, etc.), for example.

In another embodiment, the configuration template 180 may prescribe a value, state, mode, etc. for only one of the configurable settings 181 of the ID device 180. For example, a configuration template may prescribe that a peer-to-peer logging mode be set to "off" without prescribing a value, state, mode, etc. for any other configurable settings 181 that an ID device 170 may include. In yet another embodiment, the configuration template 180 may correspond to values, states, modes, etc. for an array of configurable settings 181 such that the configuration template 180 causes the ID device 170 to operate in a particular mode (e.g., a "silent" mode or a "high interference mode").

The ID device 170 may be configured to selectively adopt one of the configuration templates 180 in various circumstances. More particularly, the ID device 170 may adopt a configuration template by using processing circuitry to execute computer-readable instructions stored on the ID device 170 that cause the ID device 170 to alter the configurable settings 181, as prescribed by the configuration template 180, according to one embodiment. Once a configuration template 180 is adopted, the ID device 170 may operate according to the configurable settings 181 or in a particular mode as specified by the adopted configuration template 180. For example, when a configuration template 180 is adopted by an ID device 170, the previous values for some or all of the configurable settings 181 are altered in order to correspond to the values for the configurable settings 181 prescribed by the configuration template 180. In this way, the adoption of a configuration template 180 may result in a change of the configurable settings 181 of the ID device 170.

The ID device 170 may be configured to selectively adopt a configuration template 180 based on the location of the ID device 170 within a geofenced environment, according to an exemplary embodiment. More specifically, the ID device 170 is configured to selectively adopt a configuration template 180 associated with a particular zone (e.g., Zone A, B, or C, etc.) of an environment when the location of the ID device 170 is within the particular zone. For example, the ID device 170 may operate according to a first configuration template while in Zone A. When the ID device 170 enters Zone B, the ID device 170 may be configured to adopt a second configuration template. In this way, the configuration template 180—and thus the configurable settings 181—of the ID device 170 may vary according to the determined location of the ID device 170 within a geofenced environment.

In another embodiment, the ID device 170 may be configured to selectively adopt a configuration template 180 based on the location of the ID device 170 within a geofenced environment and some other factor. In one embodiment, the ID device 170 may be adopt a configuration template 180 based on a credential associated with the occupant or asset associated with the ID device 170. The credential associated with the occupant may be stored in a credential database 127 of the configuration template manager 120, according to an exemplary embodiment. In one example, the occupant associated with the ID device 170 may be a visitor with restricted access within the monitored environment where it may be desirable to increase the frequency of peer-to-peer device logging of the visitor's ID device 170 when in a sensitive zone (e.g., a zone proximate to a location of sensitive files or secret information). Likewise, an occupant may be a trainee having limited permissions to perform certain tasks associated with a zone of the monitored environment where it may be desirable to change a visual indicator on the ID device 170 to indicate to others that the individual is a trainee. In another embodiment, the ID device 170 may adopt a configuration template 180 based on the time of day, manufacturing shift, etc. For example, the ID device 170 may require a different configuration template 180 within a manufacturing zone during a first shift than during a third shift where other occupants (and thus peer-to-peer logging capabilities) are fewer. In this way, the ID device 170 may adopt a configuration template 180 based on the location of the ID device 170 in combination with some other factor or factors.

As shown in FIG. 1, the various configuration templates 180 may be stored in the configuration template manager databases 125, specifically within the configuration template database 126. The configuration template database 126 is communicably coupled to the configuration template manager 120. In this configuration, the configuration templates 180 may be stored externally from the ID device 170 (e.g., in a cloud-based database, etc.) and may be accessible by the configuration template manager 120 via the network 105. The appropriate configuration template 180 may be selected by the configuration template manager 120 and transmitted to an ID device 170. The ID device 170 may directly receive the configuration template 180 from the configuration template manager 120 via the network 105, or indirectly from a transceiver, such one of the transceivers 140, which may be communicably coupled to the configuration template manager 120 via the network 105. Once the ID device 170 receives the configuration template 180, the ID device 170 may adopt the configuration template 180 and begin operating according to the newly adopted template 180.

The configuration template manager 120 may include processing circuitry, memory, storage, and computer-readable instructions that can be executed by the processing circuitry. More particularly, the configuration template manager 120 may include computer-readable instructions that, when executed by one or more processors, cause the configuration template manager 120 to compare the determined location of the ID device with various geofenced zones within the monitored environment. After determining that the ID device is within a particular geofenced zone, the configuration template manager 120 may be configured to identify a zone-specific configuration template 180 that corresponds to the particular geofenced zone where the ID device 170 resides. The configuration template manager 120 may then transmit the zone-specific configuration template 180 to the ID device for adoption. Alternatively, the configuration template manager 120 may transmit a command to the ID device 170 to adopt the zone-specific configuration template 180.

In some embodiments, the configuration template manager 120 may first confirm that an initial configuration template 180 of the ID device (i.e. the template according to which the ID device 170 is currently operating) is different than the zone-specific configuration template 180. In other words, the configuration template manager 120 may verify that a configuration template 180 update is required before causing the ID device 170 to adopt the zone-specific configuration template 180. In the case where the initial configuration template 180 and the zone-specific configuration template 180 match, the configuration template manager 120 may refrain from transmitting a configuration template 180 or a command to adopt a configuration template 180 to the ID device 170. In another embodiment, the configuration template manager 120 determines that the configuration templates 180 match or substantially match based on a comparison of identifiers associated with one or more configuration templates 180. For example, a "privacy" configuration template may have a setting to prevent the ID device 170 from recording interactions (e.g., peer-to-peer communication, etc.) with other ID devices 170, where this particular setting may sufficiently identify the "privacy" configuration template for the purposes of determining whether two configuration templates 180 (e.g., an initial template 180 and a zone-specific template 180), according to an exemplary embodiment.

In another embodiment, the configuration template manager 120 may cause a transceiver 140 associated with the particular geofenced zone to transmit the zone-specific configuration template 180 or a command to adopt the zone-specific configuration template 180 to the ID device 170. In yet another embodiment, the configuration template manager 120 may cause a second ID device located within the particular geofenced zone as the ID device 170 to transmit the zone-specific configuration template 180 or a command to adopt the zone-specific configuration template 180 to the ID device via peer-to-peer wireless communication.

In embodiments where the ID device 170 receives a command to adopt a configuration template 180, the ID device may be configured to retrieve a configuration template 180 stored internally on the ID device 170. Accordingly, the one or more configuration templates 180 may be stored in a programmable memory device of the ID device (e.g., in RAM, ROM, a hard drive, or any other type of memory device described herein). In such embodiments, the ID device 170 may not receive a configuration template 180 from configuration template manager 120 via the network 105, but instead my receive a command or beacon from the configuration template manager 120, transceiver 140, etc. to adopt one of the configuration templates 180 stored on the memory device of the ID device 170. The ID device 170 may then select and adopt the configuration template from a collection of configuration templates stored locally in the memory device. In yet other embodiments, the ID device 170 may receive a command or a beacon from one of the transceivers 140, where the transceiver 140 receives the command from the configuration template manager 120, for example. The ID device 170 may be configured to receive the collection of locally stored configuration templates from the configuration template manager 120 during the initial activation of the ID device (i.e. when the ID device is programmed according to requirements of the geofenced configuration template management system 100).

In yet another embodiment, the ID device 170 may a location-aware device capable of determining its location within a geofenced environment. In other words, the configuration template manager 120 may not be required to determine the location of the ID device 170, according to some embodiments. In this case, the ID device 170 may, upon determining that the ID device 170 is within a particular geofenced zone, adopt a configuration template 180 associated with the particular geofenced zone. The configuration template 180 may be stored locally on the ID device 170, or may be retrieved from a configuration template manager 120 via the network 105, as discussed above. Moreover, the ID device 170 may determine its location based on a BLE beacon transmitted by a transceiver 140, where the beacon is associated with a particular geofenced zone such that an ID device 170 receiving the beacon is determined to be within the particular geofenced zone, for example. In such examples, the ID device 170 may select, based on the received beacon, a configuration template 180 associated the particular geofenced zone, or in the event no configuration template 180 is assigned to the geofenced zone, the ID device 170 may revert to a default, generic, or standard configuration template 180.

While the geofenced configuration template management system 100 of FIG. 1 shows one ID device 170, it is contemplated that the geofenced configuration template management system 100 may include a plurality of ID devices 170. More specifically, the system 100 may be used in an environment that includes a multiple occupants and/or multiple assets, where a significant portion thereof are monitored via unique ID devices 170. In such circumstances, the ID device 170 may be configured for peer-to-peer communication via ad-hoc wireless communication, Bluetooth, RFID, and/or any other radio communication protocol via one or more radios, transceivers, and/or processing circuits, according to one embodiment. Peer-to-peer communication between multiple ID devices 170 may be advantageous in circumstances where the monitored environment has a limited number of transceivers 140 or is otherwise structured to create high-interference or "dead-zone" areas wherein an ID device 170 is unable to communicate with a transceiver 140. For example, the location of an ID device 170 may be determined based on the peer-to-peer communication between the ID device 170 and nearby ID devices 170 that are able to successfully communicate with transceivers 140. Put another way, the known location of a first ID device 170 can be used to infer the location of a second ID device 170 that is in close proximity to the first ID device 170 even when the second ID device 170 may not be able to communicate with the transceivers 140 within the environment. Such peer-to-peer communication is described in greater detail below with reference to FIGS. 4 and 5B.

In other circumstances, the multiple ID devices 170 may separately communicate with the various transceivers 140 arranged throughout the environment in order to precisely determine the location of each ID device 170. In such embodiments, the transceivers 140 may be configured to communicate separately with multiple ID devices 170 simultaneously such that the location multiple ID devices 170 can be determined simultaneously via triangulation, trilateration, etc. Similarly, the configuration template manager 120 may be configured to separately monitor the location of each ID device 170. The separate monitoring of each ID device 170 may allow the configuration template manager 120 to separately transmit and/or command the adoption of a configuration template 180 to each ID device 170 based on the location of that ID device 170. In this manner, each ID device 170 may selectively adopt one of a plurality of configuration templates 180 in accordance with the location of the ID device 170, as discussed above. To facilitate communication with or between multiple ID devices 170 simultaneously, each ID device may broadcast a wireless signal including a unique identifier (e.g., a badge number, asset serial number, etc.).

As noted above, the system 100 may include transmitters 130. The transmitters 130 are divided into groups of transmitters 130 corresponding to various zones of an environment, including Zone A transmitters 131, Zone B transmitters 132, and Zone C transmitters 133, according to one embodiment. The transmitters 130 can be Bluetooth Low Energy (BLE) transceivers, 5G transceivers, Wi-Fi transceivers, etc. The transmitters 130 can transmit information such as configuration templates 180 to the ID devices 170, according to one embodiment. Likewise, the transmitters may be configured to receive data, information, or commands from devices (e.g., ID device 170, configuration template manager 120, etc.) via wireless communication (e.g., Bluetooth, Wi-Fi, etc.). While the transceivers 140 may also be capable of transmitting data (i.e. configuration templates 180) to the ID devices 170, the use of transmitters 130 to transmit configuration templates 180 may be advantageous as to preserve transceiver 140 bandwidth for location determination activities. In other words, the transmitters 130 may provide an efficient means of transmitting configuration templates 180 to various ID devices 170 without undesirably consuming bandwidth of transceivers 140, according to one embodiment.

Figure 2:
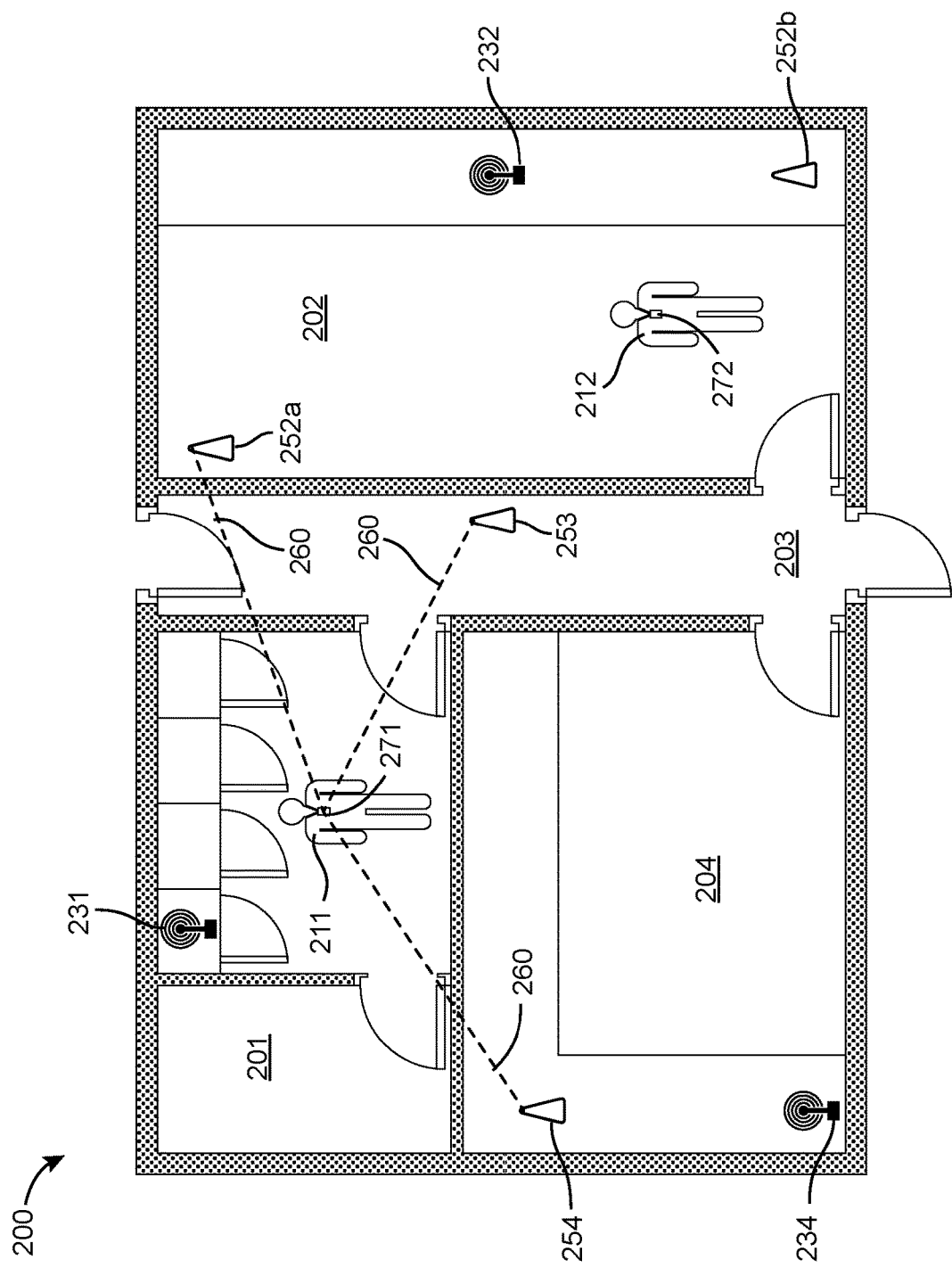
FIG. 2 is a top view of an environment served by the system for implementing a building management system with geofenced configuration templates of FIG. 1, according to an exemplary embodiment.

Referring now to FIG. 2, a top view of an example environment 200 within a monitored environment served by system 100 is shown, according to an exemplary embodiment. In this example, the environment 200 may include four rooms, including a first room 201, a second room 202, a third room 203, and a fourth room 204. The environment 200 is geofenced using transceivers 252a, 252b, 253, and 254 that are similar to those included with the geofenced configuration template management system 100 discussed above with reference to FIG. 1. In particular, the transceivers may use Bluetooth Low Energy (BLE), Ultra-wideband (UWB), Wi-Fi, or some alternative wireless communication technology. The transceivers 252a, 252b, 253, and 254 are arranged to provide occupant and/or asset (e.g., machinery, equipment, material, etc.) detection around a perimeter of the environment 200. In particular, an occupant or asset within the environment 200 may be associated with an ID device, such as the ID devices 271 and 272.

The ID devices may be BLE badges, UWB badges, or badges using a similar radio communications technology. The ID devices may additionally include processing circuitry, memory, storage, and computer-readable instructions that can be executed by the processing circuitry. According to an exemplary embodiment, the ID devices 271 may be worn or carried by occupants in the environment 200. In another embodiment, the ID devices 271, 272 may be affixed to an asset that is used in laboratory activities (e.g., a portable microscope, etc.) or an asset used in manufacturing (e.g., biomaterial that must be stored in a controlled environment). In yet another embodiment, the ID devices are provided to visitors (i.e. temporary occupants) for the duration of a temporary visit to the environment 200 and then kept in a storage location (e.g., at a reception desk of an office building) during other times. As depicted in FIG. 2, ID device 271 is worn by occupant 211 who is occupying room 201, while ID device 272 is a badge worn by occupant 212 who is occupying room 202. While only ID devices 271 and 272 are shown, it is understood that more ID devices could be used within the environment 200.

Room 201 may be used as a locker room, changing room, or storage area for personnel belongings, according to one embodiment. The second room 202, the third room 203, and the fourth room 204 may be used for various purposes, such as manufacturing operations, laboratory operations, corridors, cafeterias (e.g., canteens, cafés, etc.), for example. However, systems and methods described in the present disclosure may also apply to other settings, such as hospital or medical facilities, including field hospitals, retail, industrial or manufacturing facilities, data centers, or commercial office spaces.

Like the ID device 170 of FIG. 1, the ID devices 271 and 272 may include a plurality of configurable settings arranged in configuration templates. For example, the configurable settings of ID devices 271 and 272 may be similar to the configurable settings 181 discussed above with reference to FIG. 1 and thus may include (a) peer-to-peer logging mode, (b) peer-to-peer detection signal strength, (c) visual indicator, (d) speaker volume, (e) vibration motor, (f) ID broadcast frequency, (g) ID broadcast interval, (h) ID broadcast strength, (i) user credentials (e.g., credentials associated with occupants 211 and 212, respectively), or some other setting. Likewise, ID devices 271 and 272 are configured to adopt a configuration template, such as the configuration template 180 discussed above, that has a plurality of configurable settings (e.g., speaker volume "low", visual indicator "on", vibration motor "on", etc.).

The transceivers 252a, 252b, 253, and 254 may communicate with the ID devices 271 and 272 via low power wireless communication (e.g., BLE, Wi-Fi, UWB, or another low energy communication protocol) in order to determine the location of ID devices 271 and 272 within one of the rooms, 201, 202, 203, 204. According to an exemplary embodiment, multiple transceivers may communicate with a single ID device to accurately determine the location of the ID device using triangulation and/or trilateration.

In the example shown in FIG. 2, transceivers 252a, 253, and 254 each establish a communication signal 260 with ID device 271 to determine the location of ID device 271 as being within room 201. Thus, three communication signals 260 are established, which may allow for the location of the ID device 271 to be accurately determined. Although the embodiment of the system 100 shown in FIG. 2 is described as with a transceiver that communicates with ID devices associated with an occupant, the system 100 could similarly determine the location of an ID device with 5G based cell phone location, cell phone to cell phone communication, Time of Flight (ToF) via Wi-Fi based on cell phone Wi-Fi communication, trilateration and/or triangulation from multiple routers, etc.

Once the location of the ID device 271 within the environment 200 is accurately determined, the system 100 may determine if a current configuration template of the ID device 271 (i.e. the configuration template according to which the ID device 271 is operating) is appropriate for the determined location of ID device 271. Specifically, the configuration template manager 120 shown in FIG. 1 may determine if the current configuration template matches an assigned configuration template designated for room 201. In the event the initial configuration template matches assigned configuration template, the ID device 271 may continue to operate according to the initial configuration template. In the event the initial configuration template does not match the assigned configuration template, a configuration template manager 120 may prompt the ID device 271 to adopt the assigned configuration template, according to one embodiment.

The ID device 271 may receive the assigned configuration template via an over-the-air transmission (i.e. wireless communication). In particular, the ID device 271 may receive the assigned configuration template from the configuration template manager 120 or the transceivers 252a, 252b, 253, and 254. Likewise, the environment 200 may further include transmitters 231, 232, and 234 arranged throughout rooms 201, 202, and 204. The transmitters, like the transceivers, may be BLE, UWB, Wi-Fi, etc. devices configured to transmit data to the ID devices 271 and 272. Once the transmitted configuration template is received by the ID device 271, processing circuitry of the ID device 271 may execute computer-readable instructions that cause the configurable settings of the ID device 271 to change according to the values specified in the assigned configuration template.

In another embodiment, the ID device 271 may have a memory device capable of storing various configuration templates. Rather than receive a configuration template via wireless transmission from the configuration template manager 120 or a transceiver, or a transmitter, the ID device 271 may instead receive a command or beacon prompting the ID device 271 to adopt an assigned configuration template stored in the memory device. More particularly, the processing circuitry of the ID device 271 may execute computer-readable instructions in response to the command or beacon, where the computer-readable instructions cause the ID device 271 to alter configurable settings according to the assigned configuration template. The command or beacon may be transmitted from one or more of the configuration template manager 120, the transceivers 252a, 252b, 253, and 254 or the transmitters 231, 232, 234.

As shown in FIG. 2, the ID devices 271 and 272 are located in rooms 201 and 202, respectively. According to an example embodiment, rooms 201 and 202 may be associated with two different configuration templates according to the varying activities of the rooms 201, 202. For instance, room 201 may be a locker room where employees store their ID device outside of working hours. In this case, a "sleep" or "privacy" configuration template may be assigned to room 201 so that ID devices within room 201 will perform an ID broadcast at a very in infrequent interval (or not at all) so as to preserve battery while the ID device is not actively used by occupant 211. Similarly, a configuration template associated with room 201 may prevent ID devices within room 201 from engaging in peer-to-peer communication, which may advantageously avoid any false indication of a social distancing breach or other false error while multiple ID devices are in close proximity to one another (e.g., stored in adjacent lockers).

Room 202, on the other hand, may be designated as a loud manufacturing environment having heavy machinery and many occupants. In this case, a "high noise level" configuration template may be assigned to room 202 so that ID devices can be heard or seen by various occupants as may be required. Accordingly, the configuration template associated with room 202 may have the visual indicator configuration setting turned on, along with the speaker volume set to "high," for example.

It is understood that rooms 201, 202, 203, 204, or any other rooms in the environment 200 or in a different monitored space can include configuration templates varied to suit the needs of the monitored space. In addition, the configuration templates associated with a particular room or area may be changed as needs change (e.g., a space is converted from office space to manufacturing space). Relatedly, it is understood that the environment 200 or other spaces may use more or fewer transceivers and/or transmitters disposed in each room or amongst various rooms according to varying needs. In general, the incorporation of more transceivers and/or transmitters will bolster the accuracy or speed of location determination functionality and/or the speed at which the ID devices, transceivers, transmitters, and configuration template manager can communicate.

Figure 3A:
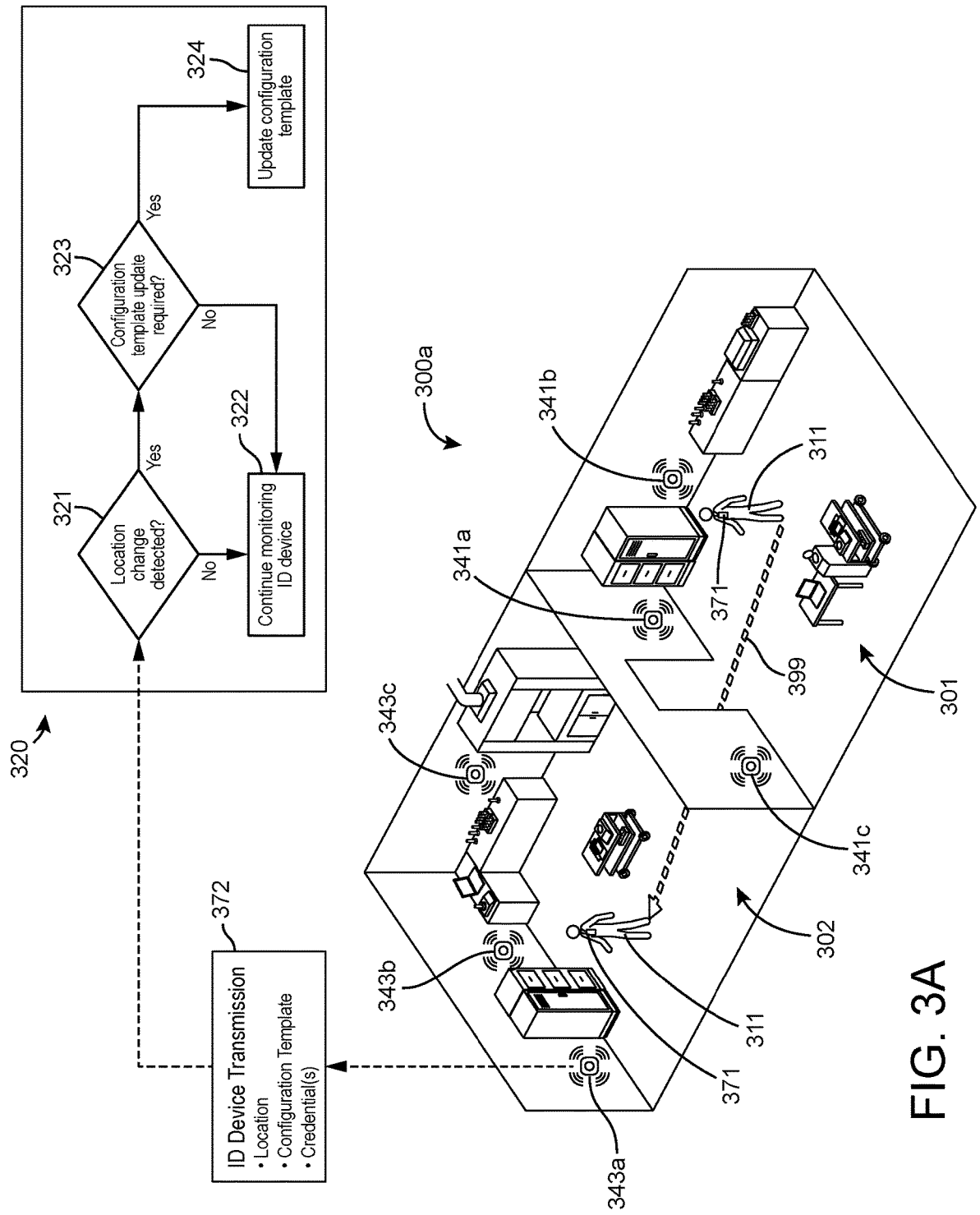
FIG. 3A is a diagram showing a system for implementing a building management system with geofenced configuration templates, according to some embodiments.

Referring now to FIG. 3A, the geofenced configuration template management system 100 is shown in an environment 300a. In this environment, two adjacent rooms 301 and 302 are shown. The environment 300a may further include one or more geofenced zones that correspond to the rooms 301 and 302, according to an exemplary embodiment. In another embodiment, the rooms 301 and 302 may both be within the same geofenced zone. In each room, a plurality of transceivers, shown as transceivers 341a, 341b, 341c, 343a, 343b, and 343c, are located along walls. Like the transceivers described above, the transceivers 341a, 341b, 341c, 343a, 343b, and 343c may use Bluetooth Low Energy (BLE), Ultra-wideband (UWB), Wi-Fi, or some alternative wireless communication technology to communicate with devices within the environment 300a. According to one embodiment, the transceivers are arranged to provide occupant and/or asset (e.g., machinery, equipment, material, etc.) detection within rooms 301 and 302 of the environment 300a. In particular, the transceivers may detect the presence of an occupant 311 who is associated with an ID device, shown as ID device 371. The ID device 371 may be a BLE badge, UWB badge, or badge using a similar radio communications technology like the ID devices 170, 271, 272 discussed above with reference to FIGS. 1 and 2. In the embodiment shown in FIG. 3A, the system 100 may further include a configuration template manager 320.

The occupant 311 may be within room 301 during a first time period. While in room 301, the ID device 371 may operate according to an initial configuration template, where the configuration template may be configured according to the activities or occupants within room 301. The location of occupant 311 may be determined to be within room 301 by the transceivers 341a, 341b, and 341c, which are disposed along the walls of room 301. Via triangulation, trilateration, or some other location-determination means, the transceivers 341a, 341b, and 341c may identify the location of the occupant 311 as being within room 301. This location may be verified in real-time, at regular intervals, or otherwise. As depicted by travel path 399, the occupant 311 may eventually move into room 302.

Once the occupant 311 has entered in room 302, the transceivers 343a, 343b, and 343c may determine that the ID device 371 is within room 302. The configuration template manager 320 may receive an ID device transmission 372 from a transceiver, such as transceiver 343a, or the ID device 371, according to an exemplary embodiment. The ID device transmission 372 may include information about the ID device 371, its current location, its current configuration template, and/or credential information of the occupant 311. In another embodiment, the ID device transmission 372 may be sent by one or more transceivers to the configuration template manager 320. In yet another embodiment, the transmission 372 may be transmitted in response to a prompt from the configuration template manager 320 or may be sent in piece-meal fashion (e.g., a transceiver transmits the location of the ID device 371, while the ID device 371 transmits configuration template information). The configuration template manager 320 may receive the ID device transmission 372 and perform a series of steps to determine if the ID device 371 requires an updated configuration template, according to an exemplary embodiment.

At step 321, the configuration template manager 320 may determine whether the location of the ID device 371 has changed relative to the geofenced zones of environment 300*a* based on the location information provided in the ID device transmission 372. If the location has not changed, the configuration template manger 320 will not cause the ID device 371 to adopt a configuration template and will instead continue monitoring the location of the ID device 371, as shown at step 322. However, if the configuration template manager 320 determines that the location of the ID device 371 has changed relative to the geofenced zones of the environment 300(*a*), the configuration template manager 320 may then determine whether a configuration template update is required, as shown at step 323.

In the embodiment shown in FIG. 3A, rooms 301 and 302 correspond to two separate geofenced zones. Therefore, at step 323, the configuration template manager 330 will determine if the current configuration template of the ID device 371 matches a configuration template associated with geofenced zone corresponding to room 302 (i.e. where the ID device now resides). If the configuration templates match, no update is required, and the configuration template manager 320 will not cause the ID device 371 to adopt a configuration template. In such cases, the configuration template manager will continue to monitor the location of the ID device, as shown at step 322. If, however, the current configuration template and the template associated with room 302 are different, the configuration template manager 320 may cause the ID device 371 to adopt the configuration template associated with room 302, according to an exemplary embodiment.

Figure 3B:
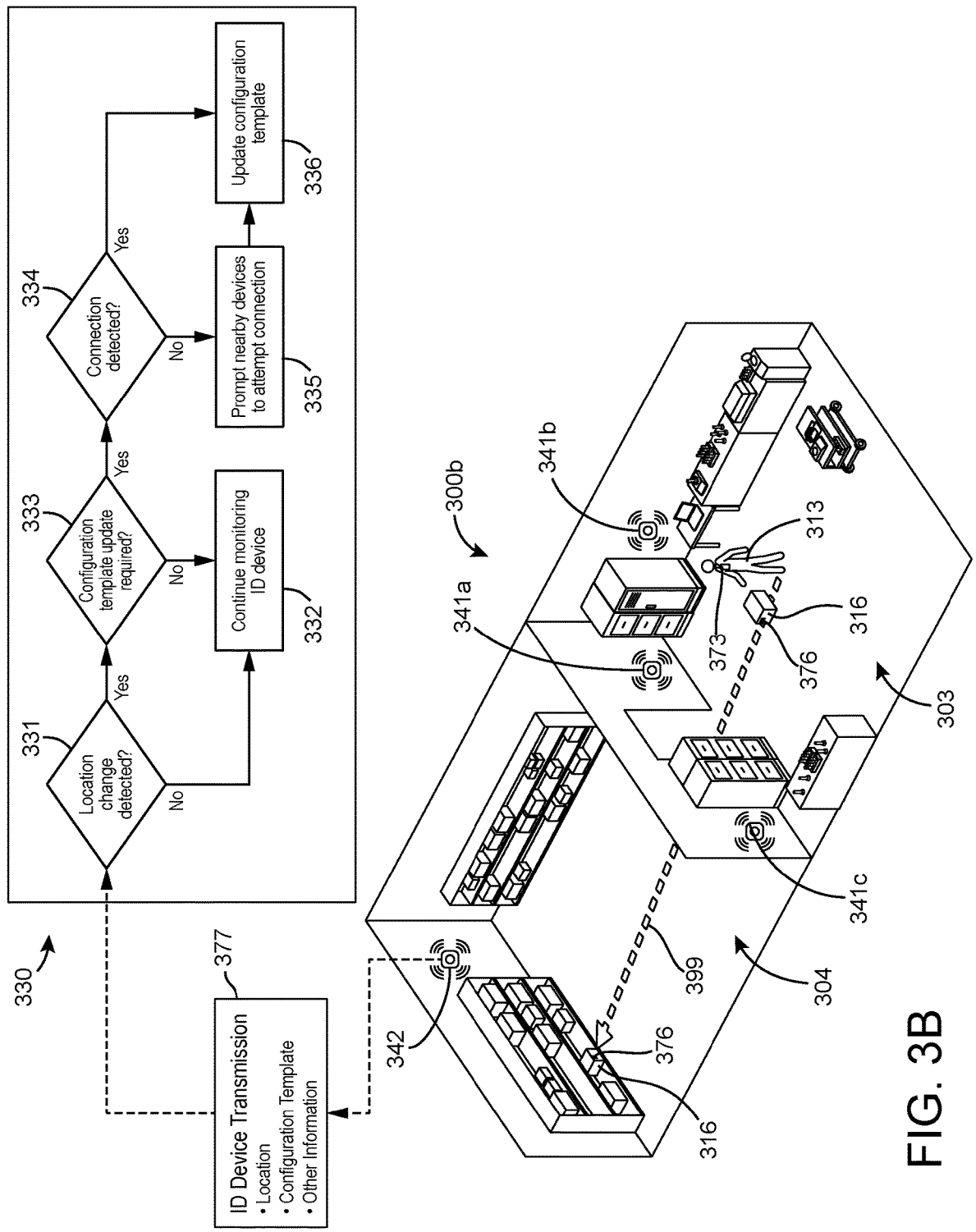
FIG. 3B is a diagram showing another system for implementing a building management system with geofenced configuration templates, according to some embodiments.

Referring now to FIG. 3B, the geofenced configuration template management system 100 is shown in an environment 300*b*. In this environment, two adjacent rooms 303 and 304 are shown. The environment 300*b* may further include one or more geofenced zones that correspond to the rooms 303 and 304, according to an exemplary embodiment. In another embodiment, rooms 303 and 304 may both be within the same geofenced zone. In each room, at least one transceiver, shown as transceivers 341*a*, 341*b*, 341*c*, 342, are located along walls. Like the transceivers described above, the transceivers 341*a*, 341*b*, 341*c*, 342 may use Bluetooth Low Energy (BLE), Ultra-wideband (UWB), Wi-Fi, or some alternative wireless communication technology to communicate with devices within the environment 300*b*. According to one embodiment, the transceivers are arranged to provide occupant and/or asset (e.g., machinery, equipment, material, etc.) detection within rooms 303 and 304 of the environment 300*b*. In particular, the transceivers may detect the presence of an asset, shown as asset 316, that is associated with an ID device, shown as ID device 376. The transceivers may further detect the presence of another ID device 373 that is associated with occupant 313. The ID device 376 may be a BLE asset tag, UWB asset tag, or asset tag using a similar radio communications technology like the ID devices 170, 271, 272 discussed above with reference to FIGS. 1 and 2. In the embodiment shown in FIG. 3B, the system 100 may further include a configuration template manager 330.

The asset 316 may be within room 303 during a first time period. While in room 303, the ID Device 371 may operate according to an initial configuration template, where the configuration template may be designed to accommodate the activities or occupants within room 303. The location of asset 316 may be determined to be within room 303 by the transceivers 341*a*, 341*b*, and 341*c*, which are disposed along the walls of room 303. Via triangulation, trilateration, or some other location-determination means, the transceivers 341*a*, 341*b*, and 341*c* may identify the location of the asset 316 as being within room 303. This location may be verified in real-time, at regular intervals, or otherwise. As depicted by travel path 399, the asset 316 may eventually be moved into room 304.

Once the asset 316 is in room 304, the transceiver 342 may determine that the ID device 376 is also within room 304. The configuration template manager 330 may receive an ID device transmission 377 from a transceiver, such as the transceiver 342, or the ID device 376, according to an exemplary embodiment. The ID device transmission 376 may include information about the ID device 376, its current location, its current configuration template, and/or other information about the asset 316. In another embodiment, the ID device transmission 377 may be sent by the transceiver 342 to the configuration template manager 330. In yet another embodiment, the transmission 372 may be transmitted in response to a prompt from the configuration template manager 320 or may be sent in piece-meal fashion (e.g., a transceiver 342 transmits the location of the ID device 376, while the ID device 376 transmits configuration template information). The configuration template manager 330 may receive the ID device transmission 377 and perform a series of steps to determine if the ID device 376 requires an updated configuration template, according to an exemplary embodiment.

At step 331, the configuration template manager 330 may determine whether the location of the ID device 376 has changed relative to the geofenced zones of environment 300*b* based on the location information provided in the ID device transmission 377. If the configuration template manager 330 determines that the location of the ID device 371 has changed between geofenced zones, the configuration template manager 330 may then determine whether a configuration template update is required, as shown at step 333. More specifically, the configuration template manager 330 will determine if the current configuration template of the ID device 376 matches a configuration template associated with the geofenced zone containing room 304 (i.e. where the ID device now resides). If the configuration templates match, no update is required, and the configuration template manager 330 will not cause the ID device 376 to adopt a configuration template. In such cases, the configuration template manager will continue to monitor the location of the ID device, as shown at step 332.

If the configuration template manager 330 determines that an updated configuration template is required, the configuration template manager 330 may then determine whether an adequate connection can be established with the ID device 376 at step 334. In the event the configuration template manager 330 is unable to establish an adequate connection with the ID device 376 (i.e. a connection sufficient to transmit a data packet containing a configuration template, for example), the configuration template manager 330 may prompt nearby devices, such as other ID devices, transceivers, transmitters, etc. within close proximity to the last known location of the ID device 376 to establish a connection with the ID device 376 so that an updated configuration template or a command to adopt a configuration template may be transmitted to the ID device 376, as shown at step 335. In the event no such connection can be established, the ID device 376 may be configured to revert to a default configuration template after passage of a certain period of time without successful connection with the configuration template manager 330 or other communication device, as discussed above.

If the configuration template manager 330 or another device is able to establish a sufficient connection with the ID device 376, the configuration template manager 330 may cause the ID device 376 to adopt the configuration template associated with the geofenced zone including room 304 at step 336, according to an exemplary embodiment. Likewise, the configuration template manager 330 may prompt a nearby device to transmit the relevant configuration template or a command to adopt the relevant configuration template to the ID device 376.

Figure 4:
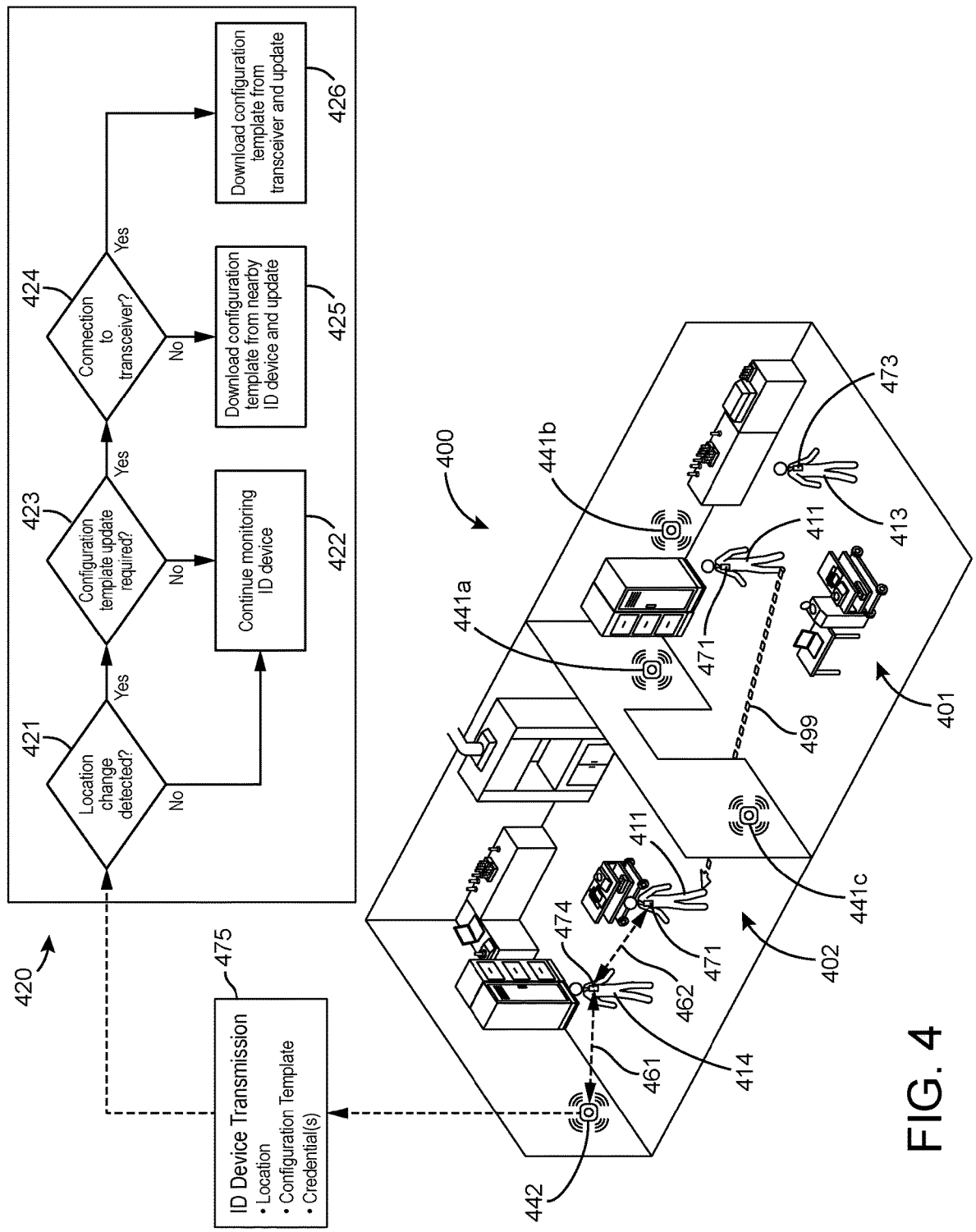
FIG. 4 is a diagram showing another system for implementing a building management system with geofenced configuration templates, according to some embodiments.

Referring now to FIG. 4, the geofenced configuration template management system 100 is shown in an environment 400. In this environment, two adjacent rooms 401 and 402 are shown. The environment 400 may further include one or more geofenced zones that correspond to the rooms 401 and 402, according to an exemplary embodiment. In another embodiment, the rooms 401 and 402 may both be within the same geofenced zone. In each room, a plurality of transceivers, shown as transceivers 441a, 441b, 441c, and 442 are located along walls. Like the transceivers described above, the transceivers 441a, 441b, 441c, and 442 may use Bluetooth Low Energy (BLE), Ultra-wideband (UWB), Wi-Fi, or some alternative wireless communication technology to communicate with devices within the environment 400. According to one embodiment, the transceivers are arranged to provide occupant and/or asset (e.g., machinery, equipment, material, etc.) detection within rooms 401 and 402 of the environment 400.

At a first time period, the transceivers 441a, 441b, 441c may detect the presence of a first occupant 411 and a second occupant 412 within the room 401. The first occupant 411 is associated with an ID device, shown as ID device 471, and the second occupant 412 is associated a second ID device, shown as ID device 472. At the same time, transceiver 442 may detect the presence of a third ID device, shown as ID device 473, in the room 402, where the ID device 473 is associated with a third occupant 413. The ID devices 471, 472, 473 may be a BLE badges, UWB badges, or badge using a similar radio communications technology like the ID devices 170, 271, 272 discussed above with reference to FIGS. 1 and 2. In the embodiment shown in FIG. 4, the system 100 may further include a configuration template manager 420.

For occupants in room 401, ID devices 471 and 472 may operate according to an initial configuration template that is configured according to the activities or occupants within room 401. The location of occupants 411 and 412 may be determined to be within room 401 by the transceivers 441a, 441b, and 441c, which are disposed along the walls of room 401. As discussed above, the transceivers 441a, 441b, and 441c may identify the location of the occupants 411 and 412 via triangulation/trilateration, or some other location-determination means. This location may be verified in real-time, at regular intervals, or otherwise.

As depicted by travel path 499, the occupant 411 may eventually move into room 402. According to one embodiment, room 402 may lack sufficient transceivers to determine the location of the ID device 471 as being within room 402. For example, room 402 may be a large warehouse having various areas within the warehouse that are beyond the range of transceivers, such as transceiver 442. Therefore, once the occupant 411 has entered in room 402, the transceiver 442 may be unable to wirelessly communicate with ID device 471 for the purposes of determining that the ID device 471 is within room 402.

Instead, the location of the ID device 471 may be determined using peer-to-peer communication between ID device 471 and the ID device 473 associated with the third occupant 413. Specifically, the ID device 473 may be in communication with one or more transceivers, such as transceiver 442. Likewise, the ID devices 471 and 473 may be configured to communicate to each other wirelessly ad-hoc (e.g., via Bluetooth, RFID, and/or any other radio communication protocol via one or more radios, transceivers, and/or processing circuits). According to an exemplary embodiment, because ID device 473 is in communication with one the transceiver 442, the location of the ID device 473 may be known by the configuration template manager 420. The known location of ID device 473 may be utilized to infer the location of ID device 471. In particular, because the ID device 471 is in communication with the ID device 473, it can be inferred that ID device 471 is within close proximity to ID device 473 and thus in the same room and geofenced zone as ID device 473. The inferred location of ID device 471 can be transmitted to the configuration template manager 420 via and ID device transmission 475 transmitted through ID device 473 and/or through transceiver 442, as shown.

It is also understood that the precise location of the ID device 471 may be determined via the peer-to-peer communication between ID device 471 and ID device 473 using Near-Field Magnetic Induction (NFMI) communication technology. NFMI-enabled devices may generate short-range magnetic fields and be configured to detect the presence of a nearby ID device within the short-range magnetic field. In one embodiment, the short-range magnetic field may have a radius around the ID device of 1-2 meters. In other embodiments, the short-range magnetic field may have extend at a greater or lesser radius from the ID device. Using NFMI thus enables the ID device 473 to accurately detect the presence of ID device 471, which may further allow the system 100 to accurately infer the location of the ID device 471 within room 402, according to an exemplary embodiment.

After the configuration template manager 420 may receive the ID device transmission 475, which may be transmitted indirectly from the ID device 371 by way of the ID device 473 or transceiver 442. The ID device transmission 475 may include information about the ID device 471, its inferred current location, its current configuration template, and/or credential information of the occupant 411. As shown in FIG. 4, the configuration template manager 420 may perform a series of steps to determine if the ID device 471 requires an updated configuration template, according to an exemplary embodiment.

At step 421, the configuration template manager 420 may determine whether the location of the ID device 471 has changed relative to the geofenced zones of environment 400 based on the location information provided in the ID device transmission 475. If the location has not changed, the configuration template manger 420 will not cause the ID device 471 to adopt a configuration template and will instead continue monitoring the location of the ID device 471, as shown in step 422. However, if the configuration template manager 420 determines that the location of the ID device 471 has changed relative to the geofenced zones of the environment 400, the configuration template manager 420 may then determine whether a configuration template update is required, as shown at step 423.

In the embodiment shown in FIG. 4, rooms 401 and 402 correspond to two separate geofenced zones. Therefore, at step 423, the configuration template manager 420 may determine if the current configuration template of the ID device 471 matches a configuration template associated with geofenced zone corresponding to room 402 (i.e. where the ID device now resides). If the configuration templates match, no update is required, and the configuration template manager 420 will not cause the ID device 471 to adopt a configuration template. In such cases, the configuration template manager will continue to monitor the location of the ID device, as shown at step 422.

If, however, the current configuration template and the template associated with room 402 are different, the configuration template manager 420 may cause the ID device 371 to adopt the configuration template associated with room 402, according to an exemplary embodiment. Before a configuration template may be adopted, however, the configuration template manager 420 may be configured to determine at step 424 if the ID device 471 is connected to a transceiver and thus able to receive a configuration template transmitted by the configuration template manager 420. As detailed above, the ID device 471 may not be within range of the transceiver 442 and may therefore be unable to receive a configuration template transmitted by the transceiver 442. In such cases, the ID device 471 may receive a configuration template from a nearby device, such as ID device 473, as shown at step 425.

However, because ID devices may move in and out of range as occupants move about, the ID device 471 may be within range of a transceiver within room 402 at some later time. Accordingly, the configuration template manager 420 may verify that the ID device 471 remains out of range of transceiver 442 before instructing ID device 473 to transmit the configuration template to ID device 471. In the event the occupant 311 associated with ID device 471 moves within range of transceiver 442, it may be advantageous for the configuration template manager 420 to cause the transceiver 442 to transmit the configuration template to ID device 471, as shown at step 426. Because peer-to-peer communication may unnecessarily consume battery life of ID devices, transmitting the configuration template via the transceiver 442 may be beneficial in order to preserve battery life of ID device 473.

Figure 5A:
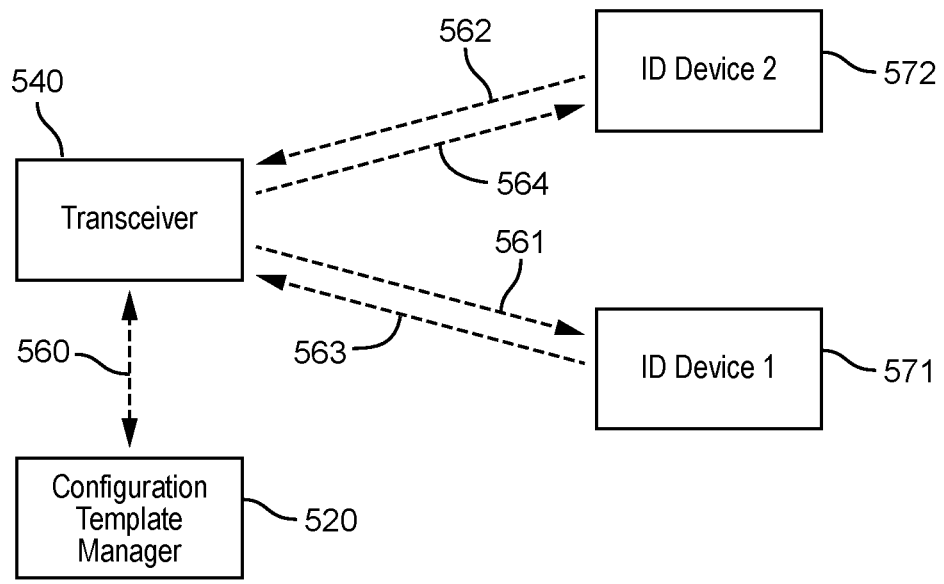
FIG. 5A is a schematic diagram of a transceiver communicating with devices of users to implement a building management system with geofenced configuration templates, according to an exemplary embodiment.

Referring now to FIG. 5A, a system 500a including a configuration template manager 520 and a transceiver 540 is shown, according to an exemplary embodiment. The transceiver 540 communicates with ID devices 571 and 572, which may be associated with occupants or assets in order to perform occupant/asset tracking in a building, according to an exemplary embodiment. The system 500a may include the transceiver 540 receiving a wireless signal from the ID devices 571 and 572, shown as signal 561 and 562, respectively. The signals 561 and 563 may include ID device information, including information about the occupant or asset with which the ID device is associated and information about a configuration template that is currently applied to the ID device. Likewise, the transceiver 540 may broadcast a wireless signal to the ID devices 571 and 572, shown as signals 563 and 564, respectively. The transceiver 540 may further broadcast and receive signals 560 to/from the configuration template manager 520. The ID devices 571 and 572 may include a power source (e.g., a battery) that enables the ID devices 571 and 572 to communicate with the transceiver 540.

The transceiver 540 and the ID devices 571 and 572 can communicate via low power wireless communication such as Bluetooth Low Energy (BLE) or another low energy communication protocol. Bluetooth-enabled devices may be used to provide accurate movement and location individuals in spaces. Although the system 500a is shown as having a transceiver 540 that communicates ID devices 571 and 572, rather than having configuration template manager 520 communicate with ID devices 571 and 572, the system 500a could similarly generate monitor the location of the ID devices 571 and 572 with 5G based cell phone location, cell phone to cell phone communication, Time of Flight (ToF) via Wi-Fi based on cell phone Wi-Fi communication, trilateration and/or triangulation from multiple routers, etc. Such embodiments may establish a more direct connection between the ID devices 571 and 572 without requiring the transceiver 540 to act as an intermediary.

The transceiver 540 can be a wire-free plug that plugs into a power outlet (e.g., AC power outlet) of a building. The transceiver 540 can be powered via the power outlet and communicate with the ID devices 571 and 572 (e.g., via BLE) and according to the geofenced configuration template management system 100 described with reference to FIG. 1. In some embodiments, the transceiver 540 is a wire-free plug that can be quickly installed by a building technician. In some embodiments, the transceiver 540 can be a device located within a space that may include one or more wires and/or is battery powered.

As noted above, the ID devices 571 and 572 can be associated with an occupant or asset, and may also be anonymized through and identifier. The identifier permits the ID devices to be associated with an occupant without including any personal information (e.g., name, age, employment position, etc.) for each occupant. Rather, configuration template manager 520 can be configured to perform a lookup with the identifier to identify the identity of each occupant based on the identifier associated with each occupant. Likewise, the configuration template manager 520 may be configured to perform a lookup based on an identified location of the ID devices 571 and 572 to identify a configuration template that should be applied to the ID devices 571 and 572 based on the identified location.

Figure 5B:
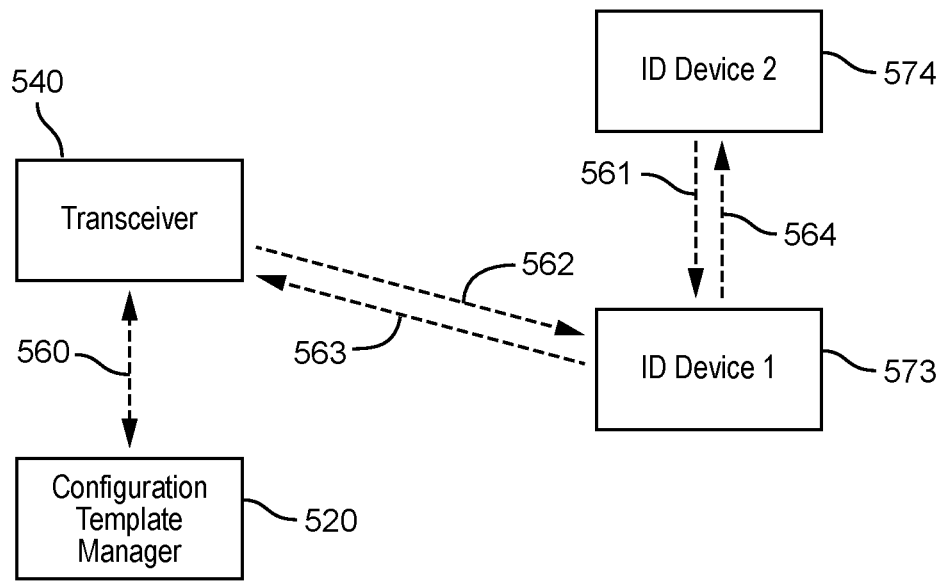
FIG. 5B is a schematic diagram of a transceiver communicating with devices of users to that communicate with each other to implement a building management system with geofenced configuration templates, according to an exemplary embodiment.

Referring now to FIG. 5B, a system 500b including the configuration template manager 520 and the transceiver 540 is shown and discussed above regarding FIG. 5A, according to an exemplary embodiment. The transceiver 540 communicates with ID devices 573 and 574, which may be associated with occupants or assets in order to perform occupant/asset tracking in a building, according to an exemplary embodiment. Likewise, the ID devices 573 and 574 communicate with each other wirelessly ad-hoc (e.g., via Bluetooth, RFID, and/or any other radio communication protocol via one or more radios transceivers, and/or processing circuits) to further perform occupant/asset tracking in the building, as is described above with reference to FIG. 4.

The system 500b may include the ID device 573 receiving a wireless signal 561 from the ID device 574. The signal 561 may include ID device information, including information about the occupant or asset with which the ID device 574 is associated and information about a configuration template that is currently applied to the ID device 574. The system 500b further depicts the transceiver 540 receiving a wireless signal 562 from the ID device 573. The signals 562 may include the same ID device information included in signal 561, namely information pertaining to ID device 574. The transceiver 540 may broadcast a wireless signal 563 to the ID device 573. The ID device 573 may then broadcast a signal 564 to the ID device 574. The transceiver 540 may further broadcast and receive signals 560 to/from the configuration template manager 520. The ID devices 573 and 574 may include a power source (e.g., a battery) that enables the ID devices 571 and 572 to communicate with the transceiver 540.

By this communication arrangement, the ID device 574 can communicate with the transceiver 540 (and thus the configuration template manager 520) through ID device 573. Such an arrangement may be advantageous in circumstances where the ID device 574 is unable to establish a connection with transceiver 540, according to one embodiment.

Figure 6:
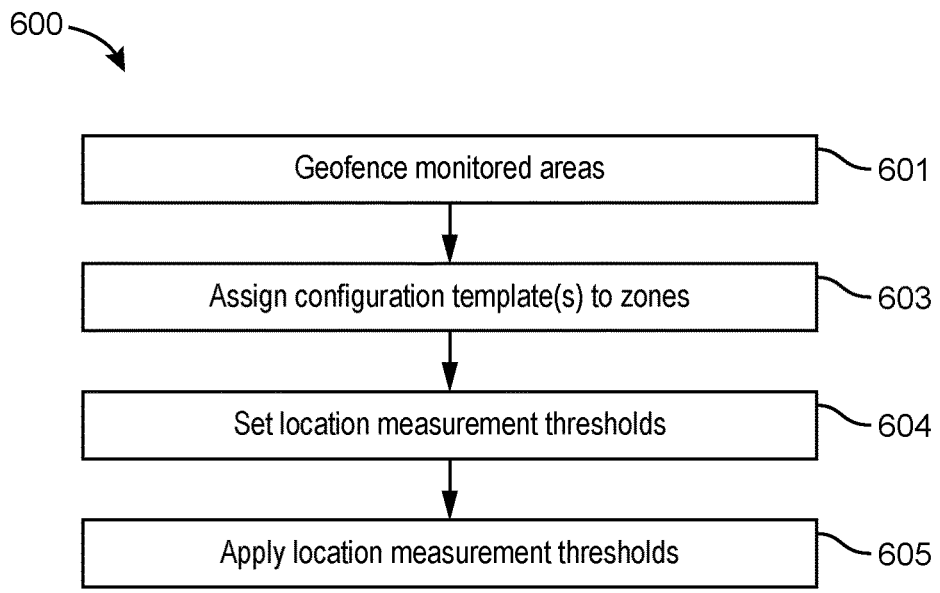
FIG. 6 is a flow chart of a method of configuring the system for implementing geofenced configuration templates of FIG. 1, according to an exemplary embodiment.

Referring now to FIG. 6, a flowchart describing a process 600 of configuring a system of geofenced areas for use with the geofenced configuration template management system 100 is shown, according to an exemplary embodiment. At step 601, monitored areas (spaces) are geofenced. For example, the boundaries of the spaces may be virtually defined within system 100 to denote the geographic limits of each space. In some cases, each space is differentiated by a wall or other physical structure. In other cases, two or more spaces may be open or continuous but defined as separate spaces using a geofencing approach at step 601.

At step 602, configuration templates are assigned to each the monitored areas. As discussed above, each configuration template may include a plurality of settings corresponding to configurable settings associated with an ID device. A configuration template may prescribe a single setting or may be associated with an operating mode of an ID device. Based on the particular environment or use of a monitored area, a configuration template may be assigned to each room to according to the various use of ID devices within the room. For example, a "privacy" configuration template whereby the ID devices do not communicate via peer-to-peer device logging may be assigned to a first monitored area that is used as a locker room or lavatory. In another example, a "high interference" configuration template whereby the peer-to-peer detection signal strength ID broadcast signal strength are increased may be assigned to a second monitored area that may include many obstructions that may interfere with communications. In yet another example, an "open zone" configuration template whereby the ID device signal strengths are reduced to conserve battery life may be assigned to a monitored area used as a cafeteria or canteen. According to an exemplary embodiment, configuration templates may be assigned, re-assigned, modified, or otherwise disassociated with a monitored area as needs vary.

At step 603, measurement thresholds and parameters are set. The measurement thresholds and parameters may include minimum dwell times for an ID device to be counted as within a space. The location measurement thresholds and parameters may also include the frequency at which the system 100 verifies the location of the ID device. The measurement thresholds and parameters can also include expected or maximum occupancy values, weighting factors, or other terms that customize the utilization calculations based on the type of space being monitored in order to accurately and efficiently determine ID device location within a space. Furthermore, the measurement thresholds and parameters may also be configured to determine how frequently the geofenced configuration template management system 100 will detect the current configuration template used by an ID device or by what means a new configuration template may be transmitted to the ID device based on the needs or use of the particular space.

At step 604, location measurement thresholds are applied. For example, at step 604 the geofenced configuration template management system 100 may remove location data that indicates that an ID device is present in a space for less than the minimum dwell threshold. As another example, at step 604 the system 100 may determine the configuration template of an ID device associated of an asset by receiving a transmission from the ID device at a regular interval. The system 100 may also monitor the status of the asset by monitoring the power consumption of the ID device, where increased power consumption indicates that the asset is in use (e.g., being moved as to activate an accelerometer of the ID device). Applying the measurement thresholds at step 604 may thereby result in a set of location and configuration template data that defines a number of ID devices within a space for each of multiple sub-periods.

Figure 7:
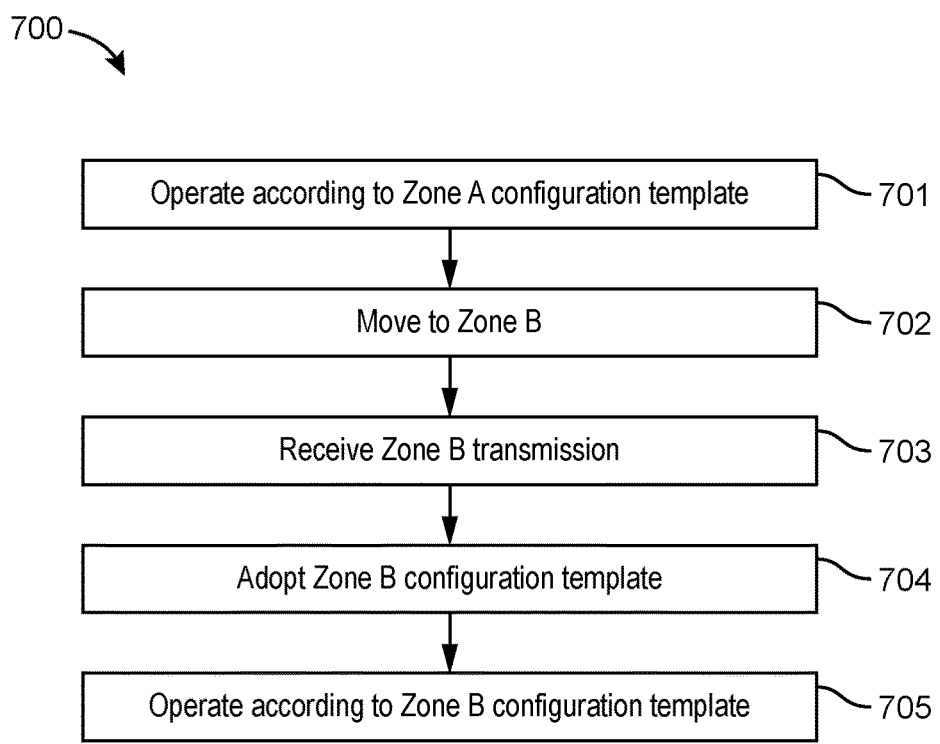
FIG. 7 is a flow chart of a method for adopting geofenced configuration templates on a device using the system of FIG. 1, according to an exemplary embodiment.

Referring now to FIG. 7, a flowchart describing a process 700 of operating an ID device within the geofenced configuration template management system 100 is shown, according to an exemplary embodiment. At step 701, and ID device is operating according to a configuration template associated with Zone A while the ID device resides in Zone A. The ID device may be associated with an occupant or a movable asset that is capable of moving or being moved from one location to another. According to an exemplary embodiment, the configuration template associated with Zone A may be configured for Zone A.

At step 702, the ID device is moved from Zone A to Zone B, where Zone A and Zone B represent distinct, separate zones within a geofenced environment. The ID device may move from Zone A to Zone B based on the movement of the occupant or asset with which the ID device is associated. For example, the ID device may be worn around the neck of an occupant as a badge attached to a lanyard, where the occupants movement from Zone A to Zone B results in the corresponding movement of the ID device from Zone A to Zone B.

At step 703, the ID device may be configured to receive a configuration template transmission from a configuration template manager, such as the configuration template manager 120, a transceiver, such as the transceiver 140, a transmitter, such as the transmitter 130, or another ID device, such as ID device 170. In particular, the ID device may receive a configuration template via wireless communication, or may receive a command to adopt a configuration template stored within a memory device of the ID device, as described in detail above. The ID device may receive a configuration template based upon a determination by the configuration template manager that the ID device location has changed and that the configuration template associated with Zone A differs from the configuration template associated with Zone B, for example. In another embodiment, transceivers within Zone B may automatically push a configuration template to the ID device as soon as the ID device is within range of said transceiver without first triangulating the location of the ID device, or example.

At step 704, the ID device is configured to adopt the configuration template pursuant to the configuration template transmission received by the ID device at step 703. In embodiments where the configuration template transmission includes the configuration template itself (i.e. data comprising a template and computer-readable instructions, not merely a command to install a template), the ID device may be configured to store the received configuration template into a memory (e.g., RAM, ROM, Flash memory, hard disk storage, etc.) and execute computer-readable instructions with a processing circuit. Upon executing the computer-readable instructions via the processing circuit, the ID device may include configurable settings that correspond to configurable setting values prescribed by the configuration template, according to an exemplary embodiment.

In embodiments where the configuration template transmission comprises a command to adopt a configuration template stored in the memory, the command may cause the ID device to execute computer-readable instructions using the processing circuitry. According to an exemplary embodiment, the instructions cause the ID device to retrieve the configuration template from memory and adjust various configurable settings as to match configurable setting values prescribed by the configuration template.

At step 705, the ID device may operate according to the configuration template associated with Zone B. Because the ID device may continue to move between various geofenced zones, it is understood that the process 700 may be occur regularly for a given ID device. Moreover, the process 700 may be performed by the geofenced configuration template management system 100 for each of a plurality of ID devices that may be operating within a particular managed environment, according to an exemplary embodiment.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A configuration template management system for a building, the system comprising one or more memory devices configured to store instructions thereon that, when executed by one or more processors, cause the one or more processors to:
    monitor a location of a device having a plurality of configurable settings within an environment, the environment having a first geofenced zone associated with a first configuration template and a second geofenced zone associated with a second configuration template;
    detect, based on the monitored location of the device, that the device is within the first geofenced zone;
    determine that at least one configurable setting of a current configuration template does not match a corresponding configurable setting of the first configuration template; and
    cause, based on the detection that the device is within the first geofenced zone and the determination that at least one configurable setting of the current configuration template does not match the corresponding configurable setting of the first configuration template, the device to adopt the first configuration template.

2. The configuration template management system of claim 1, wherein the instructions further cause the one or more processors to:
    determine that an adequate connection can be established with the device; and
    transmit, based on the determination that an adequate connection can be established with the device, the first configuration template to the device.

3. The configuration template management system of claim 1, wherein the instructions further cause the one or more processors to:
    detect, based on the monitored location of the device, that the device is within the second geofenced zone;
    cause, based on the detection that the device is within the second geofenced zone, the device to adopt the second configuration template.

4. The configuration template management system of claim 3, wherein the instructions further cause the one or more processors to cause the device to adopt the second configuration template based on a determination that the adopted first configuration template of the device does not match the second configuration template.

5. The configuration template management system of claim 1, wherein the monitored location of the device is determined by a plurality of transceivers configured to wirelessly transmit signals to the device and receive signals from the device, the plurality of transceivers located proximate to the first geofenced zone and the second geofenced zone and configured to communicate with the device using a low power wireless communication protocol.

6. The configuration template management system of claim 1, wherein the first configuration template and the second configuration template are stored in a remote configuration template database, wherein causing the device to adopt the first configuration template causes the one or more processors to:
  transmit the first configuration template to the device;
  transmit a command to the device to execute, by a processing circuit, computer-executable instructions stored thereon that cause the device to change at least one of the plurality of configurable settings to match settings of the first configuration template.

7. The configuration template management system of claim 1, wherein the first configuration template and the second configuration template are stored locally in a memory device of the device, wherein causing the device to adopt the first configuration template causes the one or more processors to:
  transmit a command to the device to execute, by a processing circuit, computer-executable instructions stored thereon that cause the device to change at least one of the plurality of configurable settings to match settings of the first configuration template.

8. The configuration template management system of claim 1, wherein the device further comprises a default configuration template, wherein the device is configured to adopt the default configuration template in absence of a signal received from a transceiver within a predetermined period of time.

9. The configuration template management system of claim 1, wherein the one or more memory devices are part of an external device in communication with the device.

10. The configuration template management system of claim 1, wherein the one or more memory devices are part of the device.

11. A method, comprising:
  monitoring, by processing circuitry, a location of a device having a plurality of configurable settings within an environment, the environment having a first geofenced zone associated with a first configuration template and a second geofenced zone associated with a second configuration template;
  detecting, by processing circuitry based on the monitored location of the device, that the device is within the first geofenced zone;
  determining, by processing circuitry, that at least one configurable setting of a current configuration template does not match a corresponding configurable settings of the first configuration template; and
  causing, based on the detection that the device is within the first geofenced zone and the determination that at least one configurable setting of the current configuration template does not match the corresponding configurable settings of the first configuration template, the device to adopt the first configuration template.

12. The method of claim 11, further comprising:
  determining that an adequate connection can be established with the device; and
  transmitting, based on the determination that an adequate connection can be established with the device, the first configuration template to the device.

13. The method of claim 11, further comprising:
  detecting, based on the monitored location of the device, that the device is within the second geofenced zone;
  causing, based on the detection that the device is within the second geofenced zone, the device to adopt the second configuration template.

14. The method of claim 13, wherein causing the device to adopt the second configuration template is based on a determination that the adopted first configuration template of the device does not match the second configuration template.

15. The method of claim 11, wherein monitoring the monitored location of the device further comprises:
  receiving location data from a plurality of transceiver devices, the plurality of transceiver devices located proximate to the first geofenced zone and the second geofenced zone and configured to transmit signals to the device and receive signals from the device.

16. The method of claim 15, wherein the device is in peer-to-peer communication with a second device, wherein the monitored location of the device can be determined by the plurality of transceiver devices based on a location of the second device.

17. The method of claim 11, wherein the first configuration template and the second configuration template are stored in a configuration template database, wherein causing the device to adopt the first configuration template comprises:
  transmitting the first configuration template to the device;
  transmitting a command to the device to execute, by a processing circuit, computer-executable instructions stored thereon that cause the device to change at least one of the plurality of configurable settings to match settings of the first configuration template.

18. The method of claim 11, wherein the first configuration template and the second configuration template are stored locally in a memory device of the device, wherein causing the device to adopt the first configuration template comprises:
  transmitting a command to the device to execute, by a processing circuit, computer-executable instructions stored thereon that cause the device to change at least one of the plurality of configurable settings to match settings of the first configuration template.

19. One or more memory devices configured to store instructions thereon that, when executed by one or more processors, cause the one or more processors to:
  monitor a location of a first device within an environment having a first geofenced zone and a second geofenced zone;
  determine, based on the monitored location of the first device, whether the first device is within the first geofenced zone or the second geofenced zone;
  responsive to determining the location of the first device is within the first geofenced zone, determine whether a current configurable setting of the first device does not match a configurable setting associated with the first geofenced zone;
  responsive to determining that that the current configurable setting of the first device does not match the configurable setting associated with the first geofenced zone, cause the first device to record interactions with one or more other devices within the first geofenced zone according to the configurable setting associated with the first geofenced zone;
  responsive to determining the location of the first device is within the second geofenced zone, determine whether the current configurable setting of the first device does not match a configurable setting associated with the second geofenced zone; and
  responsive to determining that the current configurable setting of the first device does not match the configurable setting associated with the second geofenced zone, cause the first device not to record interactions with the one or more other devices within the second geofenced zone, according to the configurable setting associated with the second geofenced zone.

20. The one or more memory devices of claim 19, wherein the instructions further cause the one or more processors to:
responsive to determining that the location of the first device is within the second geofenced zone, cause the first device to operate in a low-power mode.

* * * * *